(12) United States Patent
Mangeym et al.

(10) Patent No.: US 9,965,164 B2
(45) Date of Patent: May 8, 2018

(54) WEB APPLICATION WITH ADAPTIVE USER INTERFACE

(71) Applicant: VFA, Inc., Boston, MA (US)

(72) Inventors: Vladislav M. Mangeym, Sherborn, MA (US); Oleg Puzatkin, Rockland, MA (US)

(73) Assignee: VFA, INC., Boston, MA (US)

( * ) Notice: Subject to any disclaimer, the term of this patent is extended or adjusted under 35 U.S.C. 154(b) by 531 days.

(21) Appl. No.: 14/498,031

(22) Filed: Sep. 26, 2014

(65) Prior Publication Data

US 2015/0095794 A1 Apr. 2, 2015

Related U.S. Application Data

(60) Provisional application No. 61/883,321, filed on Sep. 27, 2013.

(51) Int. Cl.
| | |
|---|---|
| G06F 3/0485 | (2013.01) |
| G06F 3/0488 | (2013.01) |
| G06F 17/30 | (2006.01) |
| G06F 9/44 | (2018.01) |
| G06F 3/0484 | (2013.01) |

(52) U.S. Cl.
CPC ........ G06F 3/04855 (2013.01); G06F 3/0485 (2013.01); G06F 3/0488 (2013.01); G06F 17/30861 (2013.01); G06F 3/04847 (2013.01); G06F 8/38 (2013.01)

(58) Field of Classification Search
CPC .... G06F 3/04847; G06F 8/38; G06F 3/04855; G06F 17/30861; G06F 3/0485; G06F 3/0488
See application file for complete search history.

(56) References Cited

U.S. PATENT DOCUMENTS

| | | | | |
|---|---|---|---|---|
| 2011/0119637 | A1* | 5/2011 | Tuli | G06F 17/30749 715/863 |
| 2012/0123989 | A1* | 5/2012 | Yu | G06Q 10/0639 706/47 |
| 2013/0147845 | A1* | 6/2013 | Xie | G06F 3/14 345/660 |
| 2013/0321440 | A1* | 12/2013 | Georgiev | G06F 3/147 345/581 |

* cited by examiner

*Primary Examiner* — Sherrod Keaton
(74) *Attorney, Agent, or Firm* — DLA Piper LLP (US)

(57) ABSTRACT

Methods and systems are disclosed for dynamically and automatically modifying a user interface (UI) of an application based on the UI capabilities of a computer device running the application, in particular whether the computer device is touch-enabled or not.

18 Claims, 4 Drawing Sheets

WEB APPLICATION WITH ADAPTIVE USER INTERFACE

CROSS REFERENCE TO RELATED APPLICATION

This application claims priority from U.S. Provisional Patent Application No. 61/883,321 filed on Sep. 27, 2013 entitled WEB APPLICATION WITH ADAPTIVE USER INTERFACE, which is hereby incorporated by reference.

BACKGROUND

The present application relates generally to computer applications and, more particularly, to methods and systems for automatically modifying an application user interface (UI) based on UI capabilities of a computer device running the application.

Various types of input devices are available to users for performing operations on computer devices including, e.g., keyboards, mice, touchpads, and touchscreens. A touchscreen is an electronic visual display that the user can control through touch gestures by touching the screen with one or more fingers or by using a stylus. The user can, e.g., use the touchscreen to react to what is displayed and to control how it is displayed (e.g., by zooming the text size or scrolling up and down or across a page).

Web-based applications or web applications are software programs that run within a web browser executing on a computer device. The applications are coded in a browser-supported programming language (such as, e.g., JavaScript combined with a browser-rendered markup language like HTML) and reliant on the web browser to render the application executable. The user interacts with the application through the web pages generated by the browser. Web applications are received on the user device from a computer server over the Internet or other computer network.

Developers can use various types of software frameworks or platforms to build web applications. By way of example, software frameworks from Sencha Inc. such as the Sencha Touch™ framework allow developers to build web applications for touch-enabled user devices. The Sencha Ext JS™ framework allows developers to build web applications for devices that are not touch-enabled (also referred to herein as "desktop" devices).

Applications built using frameworks for desktop browsers can appear unfriendly and unintuitive to users of touch-enabled devices. A common solution for many developers is to build separate web applications for touch-enabled devices and for desktop devices. Building two separate applications can, however, significantly increase costs and resources required for software development, testing, and maintenance.

BRIEF SUMMARY OF THE DISCLOSURE

In accordance with one or more embodiments, a computer-implemented method is provided for dynamically adapting a user interface (UI) of a web application running within a browser executing on a user computer device. The UI is adapted based on UI capabilities of the user computer device in order to improve application usability. The method includes the steps, implemented in the user computer device, of: (a) determining whether the user computer device is touch-enabled or not; (b) determining whether a container on a screen of the application is scrollable; and (c) when the container is determined to be scrollable and the user computer device is determined to not be touch-enabled, automatically activating a built-in HTML scroll bar of the container, and wherein when the container is determined to be scrollable and the user computer device is determined to be touch-enabled, the built-in HTML scroll bar is inactive and a built-in touch-enabled scroll feature of the container is useable by touch gestures.

A computer system in accordance with one or more embodiments includes at least one processor, memory associated with the at least one processor, a display, and a web application supported in the memory for running within a browser executing on the computer system. The web application dynamically adapts an application user interface (UI) based on UI capabilities of the computer system in order to improve application usability. The web application contains a plurality of instructions which, when executed by the at least one processor, cause the at least one processor to: (a) determine whether the computer system is touch-enabled or not; (b) determine whether a container on a screen of the application is scrollable; and (c) when the container is determined to be scrollable and the computer system is determined to not be touch-enabled, automatically activate a built-in HTML scroll bar of the container, and wherein when the container is determined to be scrollable and the computer system is determined to be touch-enabled, the built-in HTML scroll bar is inactive and a built-in touch-enabled scroll feature of the container is useable by touch gestures.

A computer program product in accordance with one or more embodiments dynamically adapts a user interface (UI) of a web application running within a browser executing on a user computer device. The UI being adapted based on UI capabilities of the user computer device in order to improve application usability. The computer program product residing on a non-transitory computer readable medium having a plurality of instructions stored thereon which, when executed by a computer processor, cause that computer processor to: (a) determine whether the user computer device is touch-enabled or not; (b) determine whether a container on a screen of the application is scrollable; and (c) when the container is determined to be scrollable and the user computer device is determined to not be touch-enabled, automatically activate a built-in HTML scroll bar of the container, and wherein when the container is determined to be scrollable and the user computer device is determined to be touch-enabled, the built-in HTML scroll bar is inactive and a built-in touch-enabled scroll feature of the container is useable by touch gestures.

DETAILED DESCRIPTION

Figure 1:
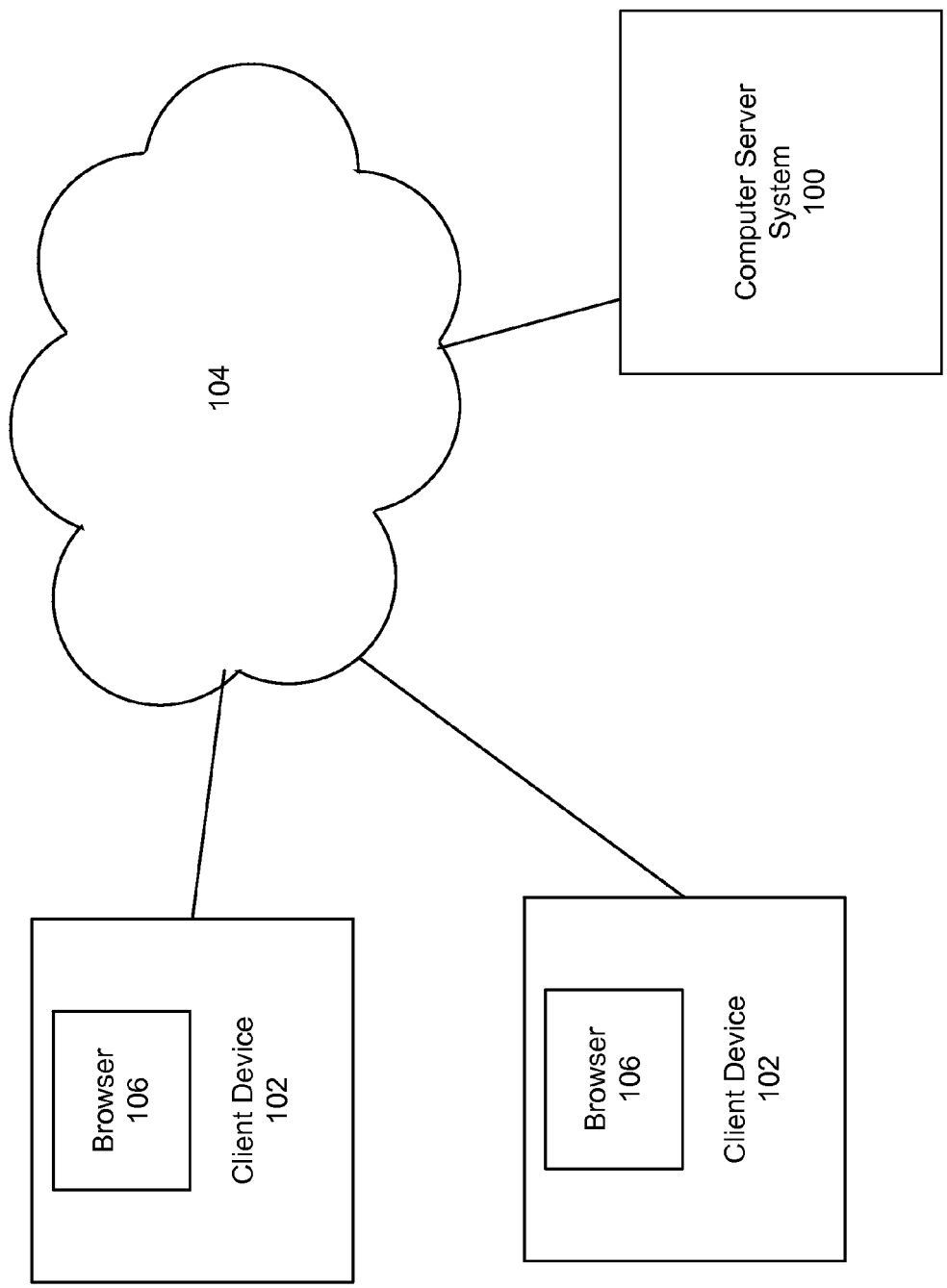
FIG. 1 is a simplified diagram illustrating an exemplary networked environment, in which web applications in accordance with one or more embodiments may be utilized.

FIG. 1 illustrates an exemplary networked environment, in which web applications in accordance with one or more embodiments may be utilized. A computer server system 100 communicates with a plurality of client computer devices 102 operated by the users over a communications network 104. The communications network 104 may comprise any network or combination of networks including, without limitation, the Internet, a local area network, a wide area network, a wireless network, and a cellular network.

The client devices 102 can comprise any computing device that can communicate with the computer server system 100 including, without limitation, personal computers (including desktop, notebook, and tablet computers) and smart phones and other smart devices. Each client device 102 includes at least one processor, a storage medium readable by the at least one processor (including, e.g., volatile and non-volatile memory and/or storage elements), and input and output devices (including a display). Each client device 102 includes a web browser 106, which can, e.g., be any of a variety of conventional web browsers such as the Microsoft Internet Explorer®, Mozilla Firefox®, Apple Safari®, and Google Chrome® web browsers.

The computer server system 100 comprises a web server, or the like, able to communicate with client devices 102 operated by users over the network. The computer server system includes one or more processors and a computer readable storage medium such as, without limitation, a computer hard-drive or removable drive or memory. A computer program having executable instructions for performing the functions described herein may be stored on the computer readable storage medium. The web server may host one or more web sites. A Uniform Resource Locator (URL) identifies a network path to Web pages maintained by the server.

A user of a client device 102 connects to the computer server system 100 over the network 104 and receives a web application. The received web application is then executed within the web browser 106. The user interfaces the web application through the web pages generated by the browser.

Web applications in accordance with one or more embodiments include adaptive user interfaces such that the same application appears intuitive and user-friendly in both desktop devices and touch-enabled devices. In the exemplary embodiments disclosed herein, the web applications are built using the Sencha Touch™ framework. It should be understood, however, that this is not a limitation of the techniques described herein, as other frameworks can also be used in a similar manner.

In accordance with one or more embodiments, by identifying and addressing a set of UI issues, Sencha Touch based applications can be made appear as intuitive and user-friendly in browsers on desktop devices as they do on touch-enabled devices. By using a Framework provided API, software code can be included in the application that is able to identify the environment/device/browser in which the application is running. Using conditional logic, certain style adjustments are made to the UI so the application will respond properly to all regular desktop interactions (such as mouse scrolls, resizing, double clicks, etc.) as well as to the touch events.

To make web applications appear "native" on touch-enabled devices, the Sencha Touch Framework proactively removes all built-in HTML scroll bars and replaces them with special touch-enabled scroll bars that only become visible when user attempts to do a "drag" action. In accordance with one or more embodiments, code is included in a Sencha Touch based application that detects whether the application is running in a desktop browser. If so, the code performs a set of opposite steps to the steps performed by the Sencha Touch Framework. Namely, the code makes touch-enabled scrolls invisible or hidden and restores default HTML scroll bars instead. The code also performs size detection for target <div> elements and is capable of showing only vertical, only horizontal, or both scrollbars, as needed.

Figure 2:
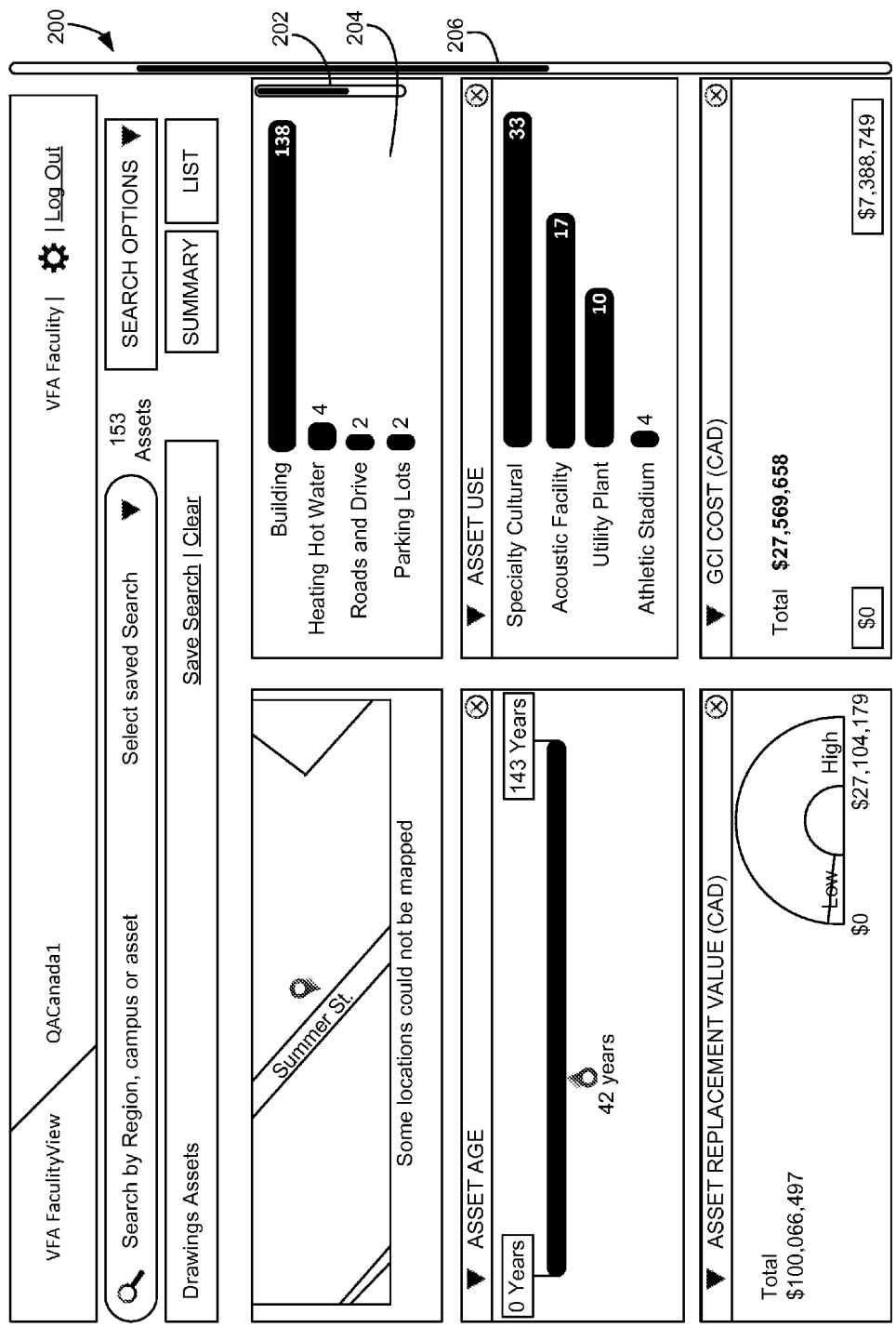
FIG. 2 is a screenshot of an exemplary web application screen rendered inside a browser on a desktop device in accordance with one or more embodiments.
Figure 3:
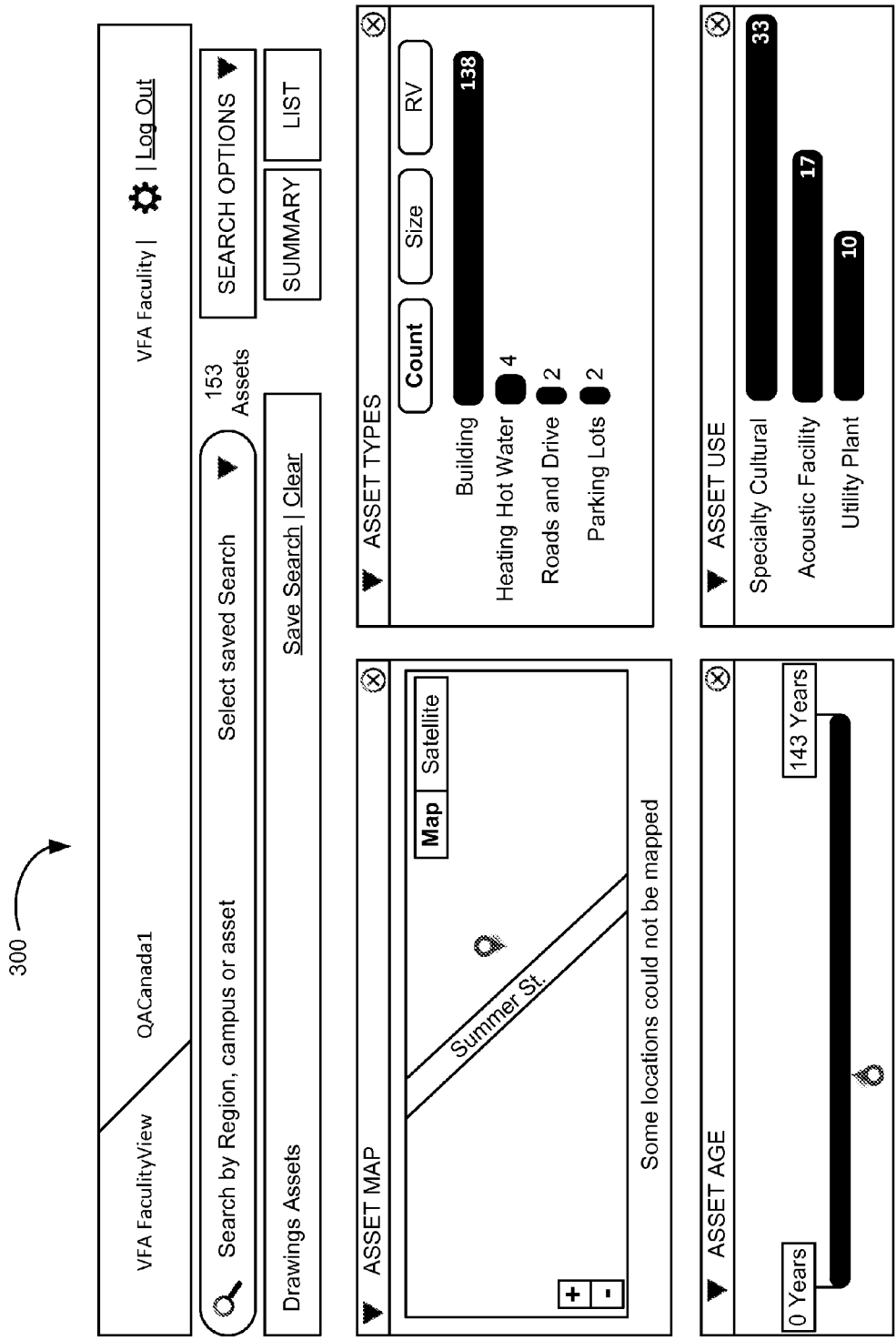
FIG. 3 is a screenshot of an exemplary web application screen rendered inside a browser on a touch-enabled device in accordance with one or more embodiments.

FIG. 2 is a screenshot of an exemplary web application screen 200 rendered inside a Chrome browser on a desktop device in accordance with one or more embodiments. The screen 200 includes a visible and active scrollbar 202 for a widget 204 and a scrollbar 206 for the base panel. FIG. 3 is a screenshot of a web application screen 300 of the same web application rendered inside a Safari browser on a touch-enabled device (in this case an iPad tablet). The scrollbars 202 and 206 (which are visible in the screen 200) are invisible on the screen 300, but are still active.

To develop web applications in accordance with one or more embodiments, the developer will need to initially identify which containers in the application screen should have "adaptive" scroll bar functionality. Containers include visual panels such as, e.g., the widget 204 in FIG. 2 and other items such as buttons.

Once identified, the array of those containers is provided to a function that processes them one at a time to customize or adapt the containers. The function is executed by the application when the containers are created at application start time.

Figure 4:
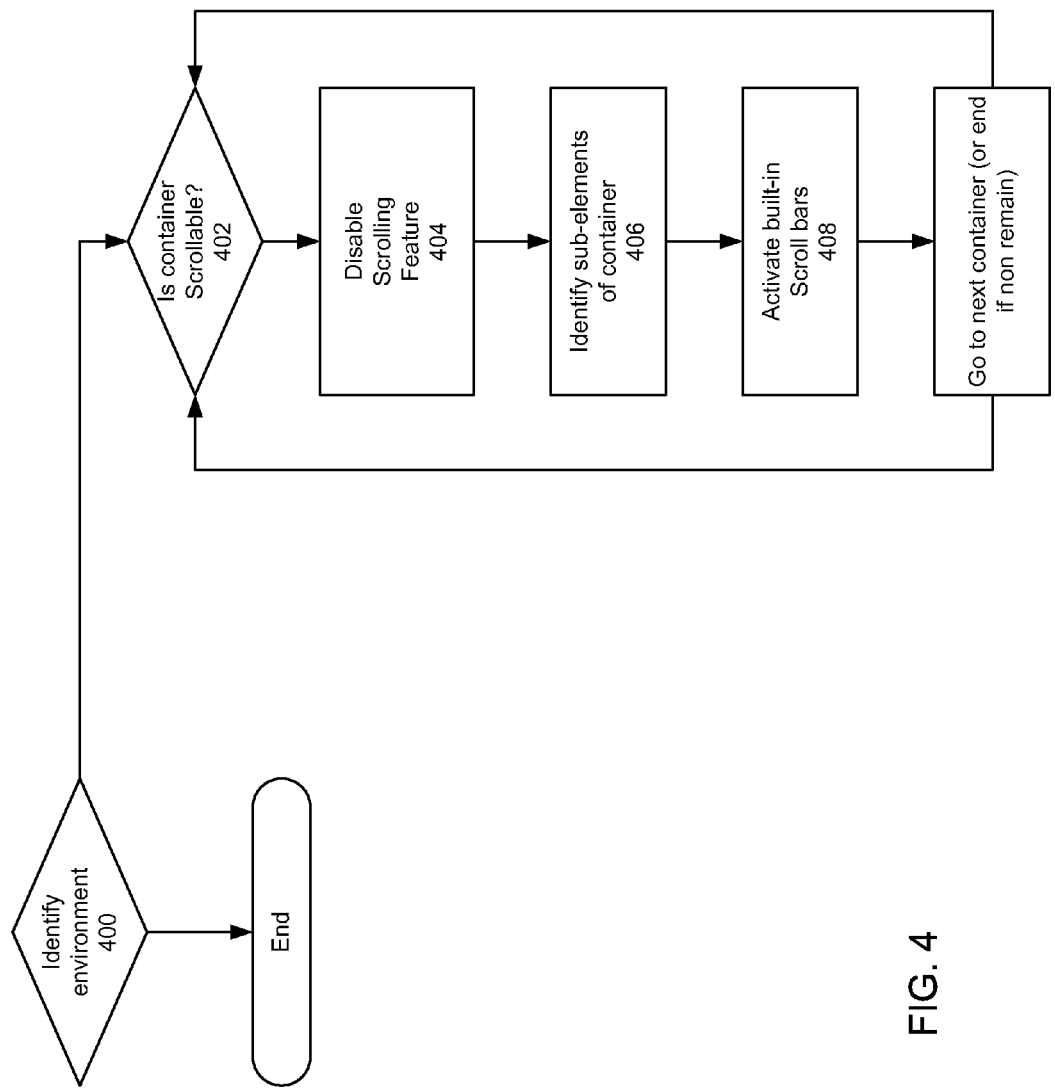
FIG. 4 is a simplified flow chart illustrating an exemplary process for modifying an application UI based on UI capabilities of a computer device running the application.

FIG. 4 is a flowchart illustrating an exemplary process performed by the function for each of the containers that has been identified to have the adaptive scroll bar functionality.

At step 400, the function identifies the environment in which the application is running (i.e., whether the user device is a touch-enabled device or a desktop device). By way of example, the environment can be identified by inspecting the "navigator" (Sencha Touch provided) objects. The "appVersion" attribute of this object will have a string that can help to identify the browser. For instance, if it includes the word "ipad" or "mobile," it indicates that this is a touch environment. This exemplary logic can be adjusted or expanded as new devices become available.

If it is determined that this is NOT a mobile/touch environment, the function determines if the container is "scrollable" at step 402. This can be done by inspecting existence and value of "scrollable" and "scrollable.scroller" properties of the given container.

If container itself is "scrollable" or it is a "selectfield" that can be expended to become a "list" (thereby making it scrollable), the function disables Sencha Touch scrolling feature by setting the "disabled" property to "true" for container's "scroller" object at step 404.

After that, at step 406, the function locates in the DOM of the container all sub elements with CSS style ".x-scroll-container" and elements with CSS style ".x-scroll-indicator." This process will find all/any sub-panels/"children" containers this container may have.

At step 408, the function activates built-in scroll bars. The function sets CSS style for containers identified in 406 for the "overflowXY" attribute to "scroll" and the "zIndex" attribute for the containers to "−1".

Optionally, the function issues an event ("fireEvent") to allow individual containers to further optimize their appearance and behavior. For example, some panels may choose to only display scrollbars for some of its "children" and disable scrollbars for others.

The process is repeated for other identified containers.

In addition to scroll bars, other UI elements can be adapted based on the environment in which the application is running. For example, the size of visual panels can be adjusted based on whether the application is running on desktop or mobile devices.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer server system may comprise one or more physical machines, or virtual machines running on one or more physical machines. In addition, the computer server system may comprise a cluster of computers or numerous distributed computers that are connected by the Internet or another network.

Accordingly, the foregoing description and attached drawings are by way of example only, and are not intended to be limiting.

What is claimed is:

1. A computer-implemented method for dynamically adapting a user interface (UI) of a web application created for a device that is touch-enabled, said web application running within a browser executing on a user computer device that is not touch-enable, said UI being adapted based on UI capabilities of the user computer device in order to improve application usability, the method comprising the steps, implemented in the user computer device, of:
   (a) determining whether the user computer device is touch-enabled or not;
   (b) determining whether a container on a screen of the application is scrollable; and
   (c) when the container is determined to be scrollable and the user computer device is determined to not be touch-enabled, automatically re-activating a disabled built-in HTML scroll bar of the container by making a touch-enabled scroll invisible or hidden and restoring a default HTML scroll bar.

2. The method of claim 1, wherein the web application is received by the user computer device from a computer server system over a computer network.

3. The method of claim 1, wherein the touch-enabled scroll feature is configured to only become visible when the user attempts a drag action.

4. The method of claim 1, further comprising detecting a size of the container and determining whether to activate a vertical scroll bar, a horizontal scroll bar, or both a vertical scroll bar and a horizontals scroll bar based on the size.

5. The method of claim 1, further comprising the step of adjusting a size of the container based on whether the user computer device is touch-enabled or not.

6. The method of claim 1, further comprising repeating steps (b) and (c) for each of a plurality of containers on the screen of the application.

7. A computer system, comprising:
   at least one processor;
   memory associated with the at least one processor;
   a display; and
   a web application supported in the memory for running within a browser executing on the computer system, said web application dynamically adapting an application user interface (UI) based on UI capabilities of the computer system in order to improve application usability, the web application containing a plurality of instructions which, when executed by the at least one processor, cause the at least one processor to:
   (a) determine whether the computer system is touch-enabled or not;
   (b) determine whether a container on a screen of the application is scrollable; and
   (c) when the container is determined to be scrollable and the computer system is determined to not be touch-enabled, automatically activate a built-in HTML scroll bar of the container by making a touch-enabled scroll invisible or hidden and restoring a default HTML scroll bar, and wherein when the container is determined to be scrollable and the computer system is determined to be touch-enabled, the built-in HTML scroll bar is inactive and a built-in touch-enabled scroll feature of the container is useable by touch gestures.

8. The computer system of claim 7, wherein the web application is received by the computer system from a computer server system over a computer network.

9. The computer system of claim 7, wherein the touch-enabled scroll feature is configured to only become visible when the user attempts a drag action.

10. The computer system of claim 7, wherein the application further comprises instructions for detecting the size of the container and determining whether to activate a vertical scroll bar, a horizontal scroll bar, or both a vertical scroll bar and a horizontals scroll bar.

11. The computer system of claim 7, wherein the application further comprises instructions for adjusting the size of the container based on whether the computer system is touch-enabled or not.

12. The computer system of claim 7, wherein the application further comprises instructions for repeating (b) and (c) for each of a plurality of containers on the screen of the application.

13. A computer program product that dynamically adapts a user interface (UI) of a web application running within a browser executing on a user computer device, said UI being adapted based on UI capabilities of the user computer device in order to improve application usability, the computer program product residing on a non-transitory computer readable medium having a plurality of instructions stored thereon which, when executed by a computer processor, cause that computer processor to:
   (a) determine whether the user computer device is touch-enabled or not;
   (b) determine whether a container on a screen of the application is scrollable; and
   (c) when the container is determined to be scrollable and the user computer device is determined to not be touch-enabled, automatically activate a built-in HTML scroll bar of the container by making a touch-enabled scroll invisible or hidden and restoring a default HTML scroll bar, and wherein when the container is determined to be scrollable and the user computer device is determined to be touch-enabled, the built-in HTML scroll bar is inactive and a built-in touch-enabled scroll feature of the container is useable by touch gestures.

14. The computer program product of claim 13, wherein the web application is received by the user computer device from a computer server system over a computer network.

15. The computer program product of claim 13, wherein the touch-enabled scroll feature is configured to only become visible when the user attempts a drag action.

16. The computer program product of claim 13, further comprising instructions for detecting a size of the container and determining whether to activate a vertical scroll bar, a horizontal scroll bar, or both a vertical scroll bar and a horizontals scroll bar based on the size.

17. The computer program product of claim 13, further comprising instructions for adjusting a size of the container based on whether the user computer device is touch-enabled or not.

18. The computer program product of claim 13, further comprising instructions for repeating (b) and (c) for each of a plurality of containers on the screen of the application.

\* \* \* \* \*